United States Patent [19]
Somasegar et al.

[11] Patent Number: 5,862,362
[45] Date of Patent: Jan. 19, 1999

[54] NETWORK FAILURE SIMULATOR

[75] Inventors: Sivaramakichenane Somasegar, Redmond; Thomas D. McGuire, Bellevue, both of Wash.

[73] Assignee: Microsoft Corporation, Redmond, Wash.

[21] Appl. No.: 538,827

[22] Filed: Oct. 5, 1995

[51] Int. Cl.⁶ .................................................. G06F 9/455
[52] U.S. Cl. ............................................................ 395/500
[58] Field of Search ............................. 395/500, 183.04, 395/183.07, 200.72, 200.64, 200.68, 200.69, 200.76; 364/578; 375/245, 224, 225

[56] References Cited

U.S. PATENT DOCUMENTS

| | | | |
|---|---|---|---|
| 5,394,540 | 2/1995 | Barrington et al. | 395/500 |
| 5,481,735 | 1/1996 | Mortensen et al. | 395/200.1 |
| 5,561,763 | 10/1996 | Eto et al. | 395/183.11 |

OTHER PUBLICATIONS

Sidhu, et al., *Inside Apple Talk®*, 1989, pp. B–3; B–17; B–18.

*Primary Examiner*—Kevin J. Teska
*Assistant Examiner*—Dan Fiul
*Attorney, Agent, or Firm*—Klarquist Sparkman Campbell Leigh & Whinston, LLP

[57] ABSTRACT

A network failure simulation tool provides simulation of a network failure suitable for automated software testing under software control. The tool intercepts packets being sent or received by a computer on a network by redirecting the packets from a network I/O architecture to substitute packet handlers. The tool also resumes normal network operation by again directing packets through actual packet handlers of the computer's network I/O architecture. Commands are provided for controlling suspension and resumption of network operation by the tool from an automated software testing program.

15 Claims, 4 Drawing Sheets

NETWORK FAILURE SIMULATOR

FIELD OF THE INVENTION

The present invention relates generally to computer software testing, and more particularly relates to network failure simulation.

BACKGROUND AND SUMMARY OF THE INVENTION

Computer software which is developed for commercial release typically is subjected to multiple rounds of testing during its development. Testing helps the developer verify that the software has the desired functionality, and to identify errors or lack of compatibility with various hardware configurations or other software. The software can then be redesigned and any errors or lack of compatibility corrected while the software is still in development and not yet released for commercial sale.

Robust operating systems, such as Microsoft Corporation's Windows NT operating system, must be capable of tolerating intermittent failures of the underlying network communications connecting two or more computers in a network. Such network failures are common in the typical, complex network topologies of today's corporate environment. Accordingly, from a testing perspective, it's important to verify at the development stage that the operating system correctly tolerates intermittent network failures.

A brief network failure can be simulated by manually unplugging the network wire connection from a computer for some duration, then manually plugging the connection back into the computer. This test methodology, however, is unsuitable for large scale automated testing.

The present invention is a software test tool and method for simulating a network failure under software control. In accordance with the invention, the software test tool and method simulates a network failure by temporarily redirecting calls intended for actual send and receive handlers in a network operating system to "substitute" handler functions. These substitute handler functions operate to intercept data being sent to or received from the network. In one embodiment of the invention, the substitute handler then returns a status datum to its caller indicating successful sending or receiving of the data, but does not actually send or receive the data. This effectively cuts off the sending and receiving of data from the network at the substitute handlers. Since no data can be sent or received, the computer is effectively disconnected from the network, as if the network connection were unplugged. The test tool and method resumes network operation by again directing calls to the actual send and receive handler functions.

In alternative embodiments, the substitute handlers can return a status datum to indicate other conditions, such as a network failure. Further, the substitute handlers in some alternative embodiments can intermittently return a status datum indicative of successful sending or receiving, and another status datum indicative of network failure.

In accordance with a further aspect of the invention, commands are provided for controlling the test tool and method from software. A "suspend network" command causes the test tool and method to simulate network failure. A "resume network" command causes the test tool and method to restore network operation. In some embodiments of the invention, the commands include options for specifying a particular network adapter card and/or network transport protocol which is to be suspended or resumed. Accordingly, through use of these commands, a software procedure can exercise deterministic control over simulated network failures. Further, network failure simulations can be automated for large scale or repetitive testing.

Software controlled simulated network failures according to the invention are beneficial in a number of testing applications, as shown by the following examples. For network domain log in tests, the primary log in server computer can be temporarily "suspended" so the client log in request is handled by a backup log in server rather than the primary server. For file transfer tests, one of the two computers can have its network operation briefly "suspended" and then "resumed" for a duration long enough to cause some network packets to be re-transmitted. For system stress testing, randomized brief network failures cause retry-disconnect-reconnect logic to execute in various system components, exposing logic paths that might otherwise not be executed except by physical failure of the underlying network. There are numerous other uses for this tool to simulate network failures.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

Figure 1:
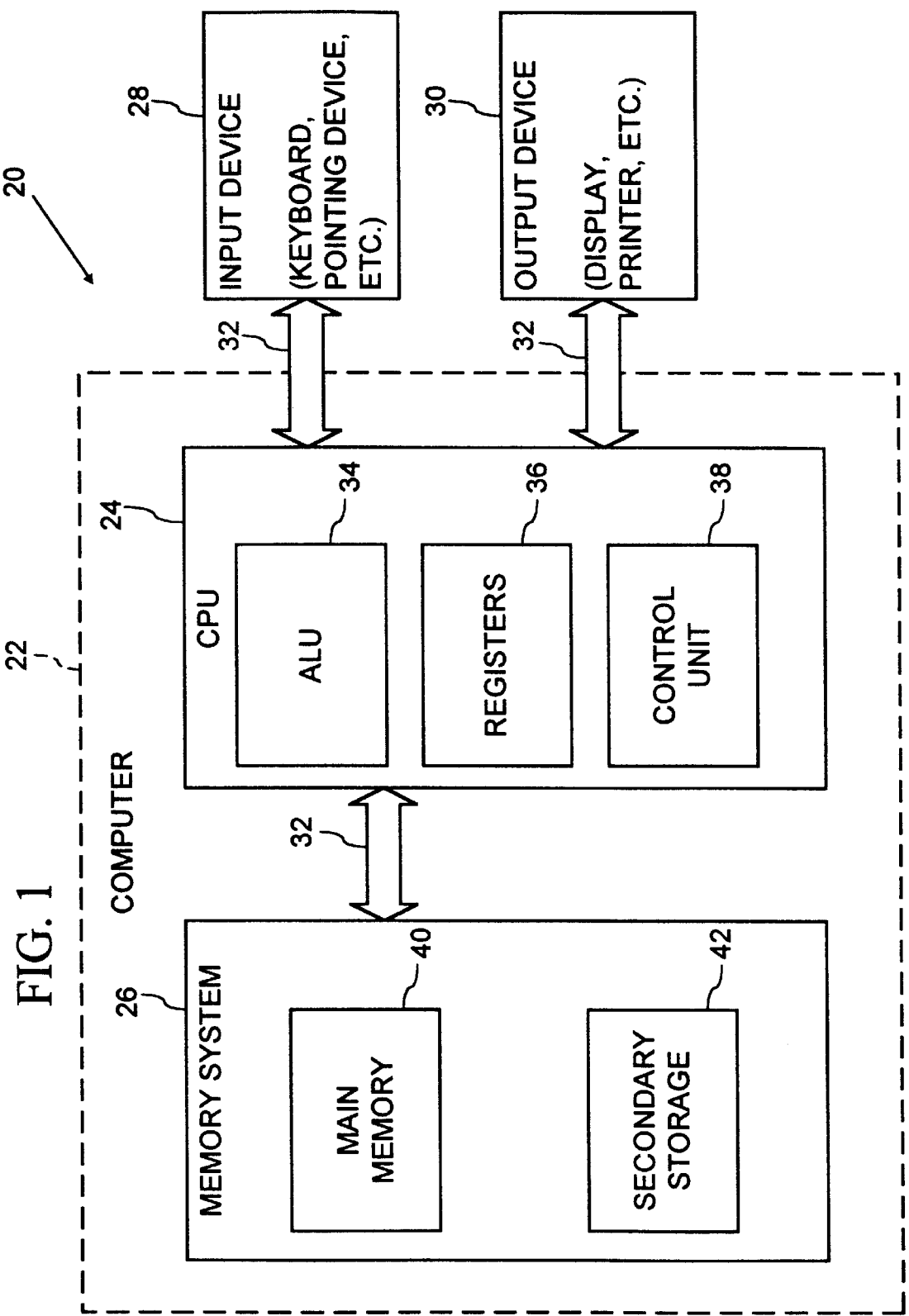
FIG. 1 is a block diagram of a computer system that may be used to implement a method and apparatus embodying the invention.

Referring to FIG. 1, an operating environment for a illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. Any of a variety of processors, including at least those from Digital Equipment, Sun, MIPS, Motorola, NEC, Intel, Cyrix, AMD, HP, and Nexgen, are equally preferred for the CPU 24. (The illustrated embodiment of the invention operates on an operating system designed to be portable to any of these processing platforms.)

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g. a microphone), etc. The output device 30 can comprise a display, a printer, a transducer (e.g. a speaker), etc. Some devices, such as a network adapter or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to symbolic representations of operations that are performed by the computer system 20. Such operations are sometimes referred to as being computer-executed. It will be appreciated that the operations which are symbolically represented include the manipulation by the CPU 24 of electrical signals representing data bits and the maintenance of data bits at memory locations in the memory system 26, as well as other processing of signals. The memory locations where data bits are maintained are physical locations that have particular electrical, magnetic, or optical properties corresponding to the data bits. The invention can be implemented in a program or programs, comprising a series of instructions stored on a computer-readable medium. The computer-readable medium can be any of the devices, or a combination of the devices, described above in connection with the memory system 26.

The present invention is illustrated in the context of Microsoft Corporation's Windows NT operating system running on the computer system 20. For a complete discussion of the Windows NT operating system see *Inside Windows NT*, by Helen Custer, Microsoft Press, 1993. A brief overview of the network input/output architecture of the Windows NT operating system and associated terminology is provided below before discussing the details of the illustrated embodiment. Alternative embodiments of the invention can operate in the context of other network capable operating systems.

Figure 2:
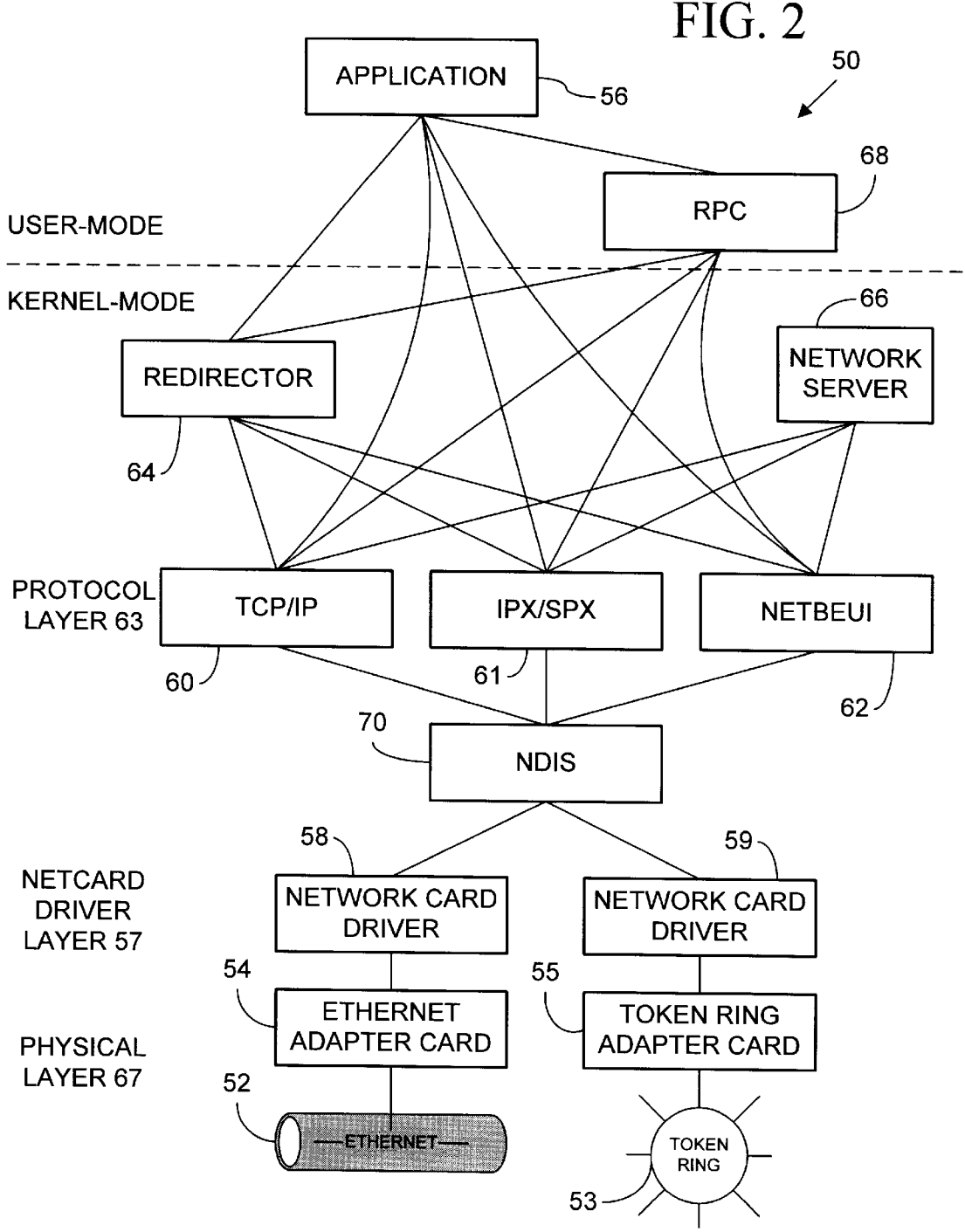
FIG. 2 is a block diagram showing a network input/output system of an operating system within a computer system such as shown in FIG. 1.

With reference to FIG. 2, the Windows NT operating system includes a network input/output ("I/O") architecture 50 for exchanging data with one or more other computers that are connected to the computer system 20 (FIG. 1) on one or more networks 52–53 with network adapter cards (hereafter "netcards") 54–55 (which act as input and output devices 28, 30 of the computer system 20 in FIG. 1). In general, each netcard 54, 55 is capable of communicating over a particular type of cable, using a particular network topology. The networks in the illustrated embodiment include an ethernet network 52 and a token ring network 53. Other network topologies, however, can be used in alternative embodiments of the invention.

The network input/output architecture 50 in the Windows NT operating system consists of multiple layers which are responsible for transforming data into a form suitable for transmission on the networks 52–53 by the netcards 54–55, and back into a form useable by application programs and operating system components. The networks 52–53 and netcards 54–55 are conceptually at a lowest layer (sometimes referred to as the "physical layer" 67) of the architecture 50. At an uppermost layer are application programs 56 running on the computer system 20 and Windows NT operating system platform at which requests for network I/O generally originate.

Next lowest above the physical layer is a netcard driver layer 57 that consists of netcard drivers 58–59 which interact directly with the netcards 54–55. Each netcard driver 58–59 is responsible for sending and receiving packets over a network connection provided by a particular one of the netcards 54–55. The netcard drivers 58–59 initiate data I/O operations on their respective netcards 54–55, and receive interrupts from the netcards 54–55. The drivers 58–59 make calls to higher layers to indicate that they have received data, and notify the upper layers of their completion of an outbound data transfer.

Above the netcard drivers 58–59 is a transport protocol layer 63 which consists of one or more protocol drivers 60–62 which each implement a network transport protocol. Network transport protocols are a set of rules and conventions that govern communications between two computers over a network. In general, the protocol drivers 60–62 divide and package data into packets for sending on the network, and assign numbers to the packets to ensure that they are all received in the proper order. The protocol drivers 60–62 also reassemble packets received over the networks 52–53 from other computers. The illustrated embodiment includes a Transmission Control Protocol/Internet Protocol ("TCP/IP") transport protocol driver 60, an Internet Packet Exchange/Sequenced Packet Exchange ("IPX/SPX") transport protocol driver 61, and a NetBIOS Extended User Interface ("NetBEUI") transport protocol driver 62. Other network transport protocols are known and can be implemented by drivers in the transport protocol layer, including DECnet, AppleTalk, and XNS transport protocols.

Above the protocol layer are a redirector 64 and a network server 66. The redirector 64 steers locally issued I/O requests to a network server of a remote computer, and the network server 66 receives and processes such requests from other computers. For this purpose, the network redirector 64 provides facilities necessary for one Windows NT-based machine to access resources on other machines on a network. The redirector can access remote files, named pipes, and printers through the networks 52–53. The network server 66 provides facilities which allow access to resources of the computer system 20 by other machines on the networks 52–53. In the Windows NT operating system, the redirector 64 and the server 66 support the SMB protocol for compatibility with existing MS-NET and LAN Manager servers (thus allowing access to MS-DOS, Windows, and OS/2 systems from Windows NT), as well as the NCP protocol for communication with Netware-compatible servers and clients. The redirector also implements security mechanisms to ensure that the data shared on the network is protected from unauthorized access. The redirector is designed to recover gracefully from network failures and operate as a file system.

The network I/O architecture 50 also provides a remote procedure call facility ("RPC") 68. The RPC 68 includes a run-time library and compiler that implement a mechanism for the application programs 56 to call software procedures resident on remote computers as if a local software procedure. The RPC simplifies development of distributed applications by providing a procedural view of networked operations rather than a transport-centered view. In applications adhering to a transport-centered view, the application itself includes code to transmit computational or I/O-related requests across a network, handle network protocols, deal with network errors, wait for results, etc. The RPC facility handles these tasks automatically on behalf of the applications 56. The applications 56 can then call functions through the RPC facility 68 that are executed on remote machines connected via the networks 52–53. The applications 56 and the RPC facility 68 are programs and modules of code that operate in a user-mode of the computer system, whereas other components of the network I/O architecture operate in a more privileged kernel-mode of operation reserved for privileged components of the Windows NT operating system.

The network I/O architecture 50 additionally includes an interface layer 70 between the protocol layer and the netcard layer, which in the Windows NT operating system is referred to as the network driver interface specification ("NDIS"). The NDIS interface layer 70 provides a standard interface which allows any of the protocol drivers 60–62 to communicate with any of the netcard drivers 58–59. This standard interface shields the netcard drivers 58–59 from the details of the protocol drivers 60–62, and vice versa.

Figure 3:
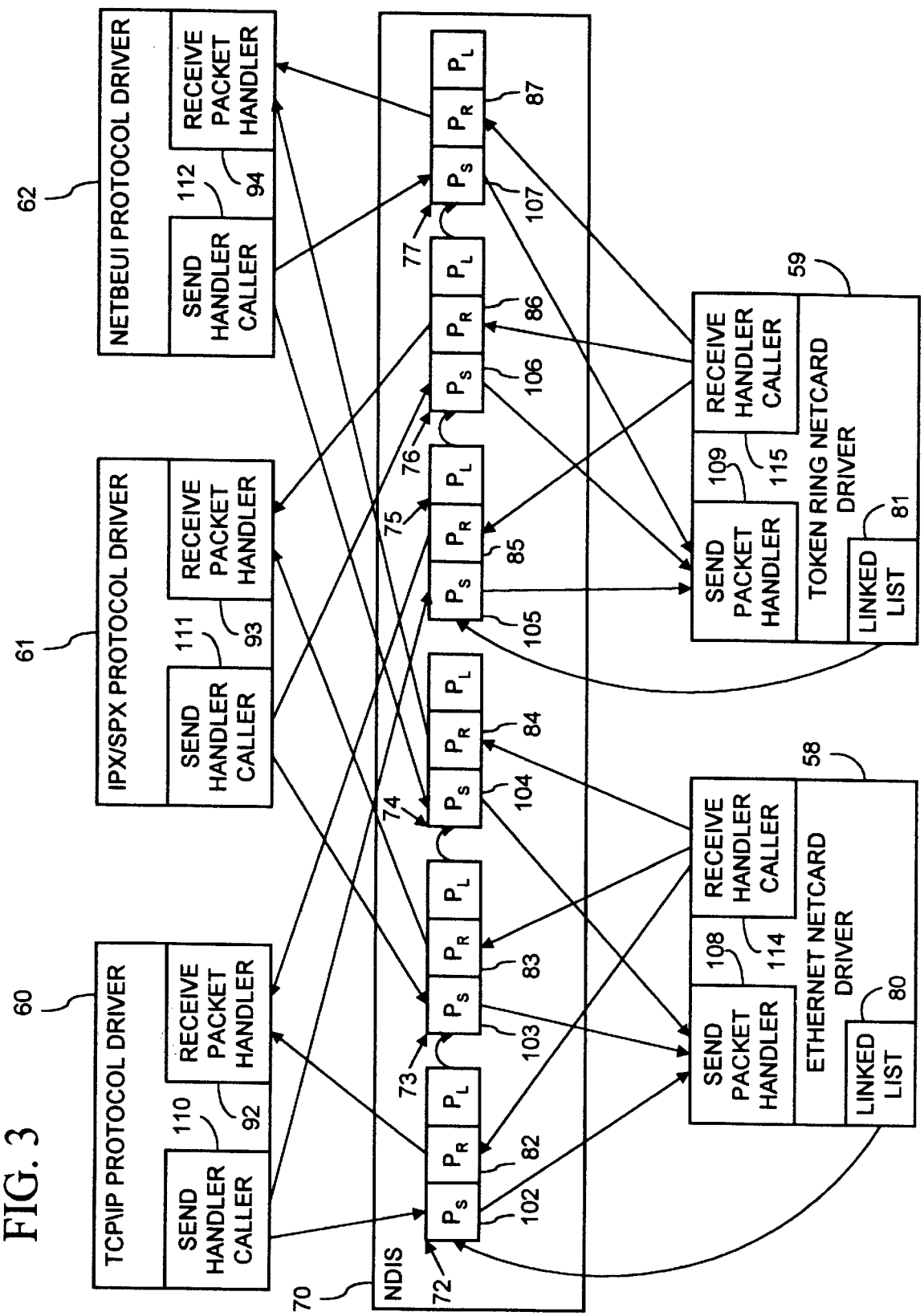
FIG. 3 is a block diagram of an interface layer between network card drivers and transport protocol drivers in the network input/output system of FIG. 2.

With reference to FIG. 3, at the NDIS interface layer 70, each underlying netcard driver 58, 59 in the netcard layer is connected to each overlying protocol driver 60–62 in the protocol layer by structures called open blocks 72–77, which are organized in linked lists 80, 81 associated respectively to and having root pointers stored at the netcard drivers 58, 59. Each open block 72–77 contains information specific to the interaction between a specific netcard driver 58–59 and a specific protocol driver 60–62. Among the information stored in each of the open blocks 72–77, the NDIS interface layer 70 maintains a receive pointer 82–87 (labeled "$P_R$" in FIG. 3) to a receive packet handler 92–94 in the respective protocol driver 60–62 of the open block, and a send pointer 102–107 (labeled "$P_s$" in FIG. 3) to a send packet handler 108–109 in the respective netcard driver 58–59 of the open block. When one of the protocol drivers 60–62 sends a packet on one of the networks 52–53 (FIG. 2), a send handler caller 110–112 in that protocol driver 60–62 ultimately calls the send packet handler 108–109 in the respective netcard driver 58–59 of the particular network 52–53 via the stored send pointer 102–107 in the open block connecting that protocol driver 60–62 to the respective netcard driver. For example, the send handler caller 111 of the IPX/SPX protocol driver 61 sends a packet on the ethernet network 52 (FIG. 2) by calling the send packet handler 108 of the ethernet netcard driver 58 via the send pointer 103 in the open block 73.

Likewise, when one of the netcard drivers 58–59 receives a packet from its respective network 52–53, that netcard driver indicates to a particular protocol that the packet has been received by calling a receive packet handler 92–94 in the respective protocol driver 60–62 of the particular protocol via the stored receive pointer 82–87 in the open block connecting that netcard driver to the respective protocol driver. The call is made by code referred to herein as a receive handler caller 114–115 in the netcard driver 58–59. For example, the receive handler caller 115 in the token ring netcard driver 59 indicates to the NetBEUI protocol that a packet is received by calling the receive packet handler 94 in the NetBEUI protocol driver 62 via the receive pointer 87 in the open block 77. The NDIS interface layer 70 maintains open blocks 72–77 for all the netcard driver 58–59/protocol driver 60–62 combinations currently running in the system in the linked lists 80, 81.

Figure 4:
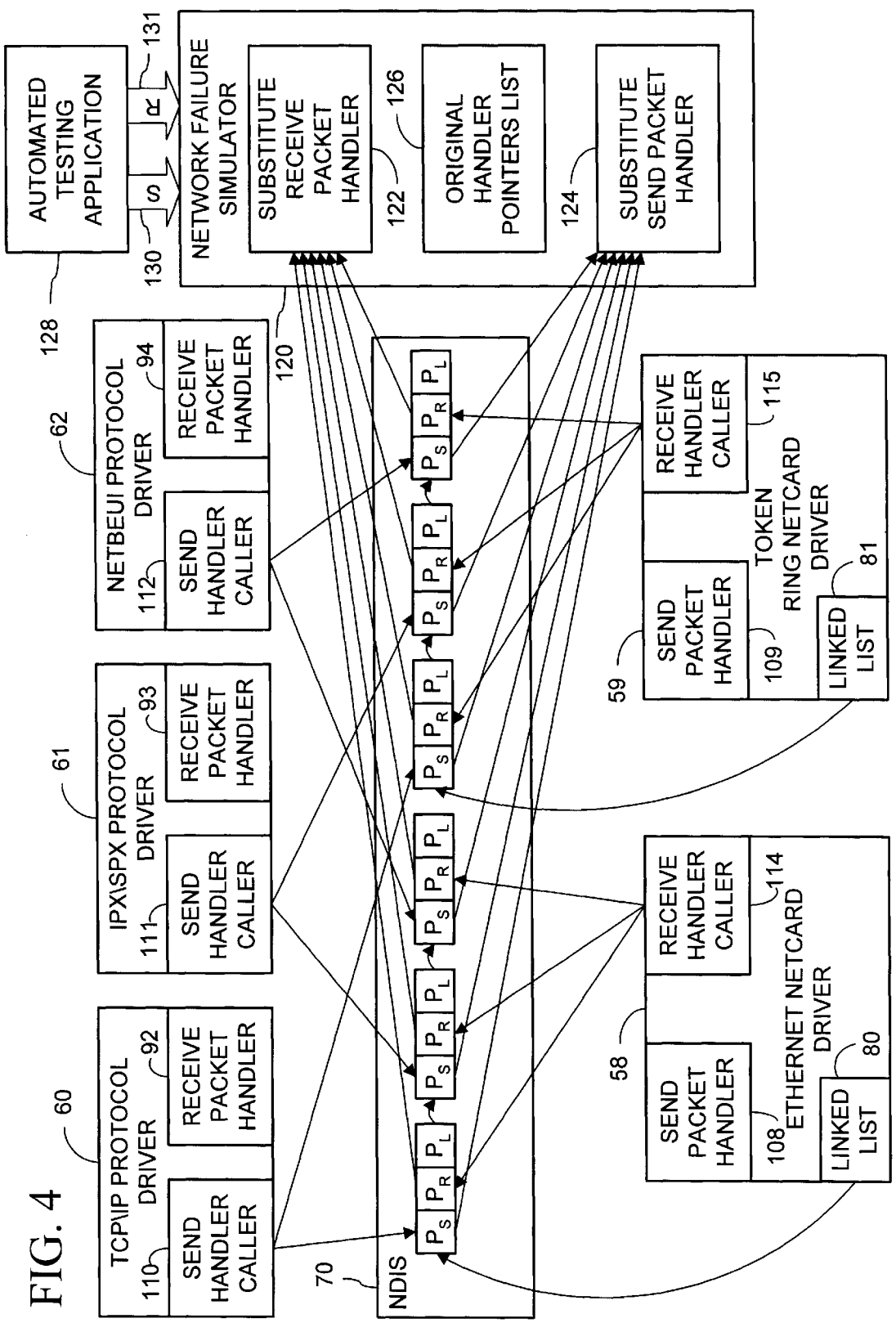
FIG. 4 is a block diagram of a network failure simulator according to an illustrated embodiment of the invention for simulating network failure by redirecting send and receive handler pointers in the interface layer of FIG. 3 to substitute send and receive handlers.

With reference to FIG. 4, a network failure simulation tool 120 according to the invention simulates a network failure in the computer system 20 (FIG. 1) under software control for automated testing of software. The network failure simulation tool 120 simulates a network failure in the computer system 20 by interrupting data being sent and received through the network I/O architecture 50. The data preferably is interrupted at a layer as close as possible to the physical layer (i.e., the netcards 54–55 and networks 52–53). This allows all higher-level layers of the network I/O architecture 50 which are farther from the physical layer to benefit from simulated network failures.

In the illustrated embodiment, the network failure simulation tool 120 implements a "point-of-failure" at the NDIS interface layer 70 of the network I/O architecture 50 (FIGS. 2–3). The NDIS interface layer 70 is the preferred point-of-failure in the network I/O architecture 50 of the Windows NT operating system for two reasons: (1) the NDIS interface layer 70 is close to the physical layer (only the netcard drivers 58–59 are closer); and (2) all network communications are routed through the NDIS interface layer 70, whereas the protocol layer immediately above and the netcard driver layer immediately below the NDIS layer 70 provide multiple pathways for network communications. This allows the network failure simulation tool 120 to simulate a network failure that affects all layers and components above the NDIS interface layer 70, while not requiring hardware-specific intervention at the underlying netcard driver layer.

For simulating a network failure, the network failure simulation tool 120 includes a "substitute" receive packet handler 122, a "substitute" send packet handler 124, and an original pointers list 126. The network failure simulation tool 120 causes a simulated network failure at the NDIS interface layer 70 by redirecting calls from the send handler callers 110–112 of the protocol drivers 60–62 which are intended for the send packet handlers 108–109 to the substitute send packet handler 124, and also redirecting calls from the receive handler callers 114–115 of the netcard drivers 58–59 which are intended for the receive packet handlers 92–94 in the protocol drivers 60–62 to the substitute receive packet handler 122. The network failure simulation tool 120 redirects the calls by obtaining the linked lists 80, 81 of open blocks 72–77 from the NDIS interface layer 70. The network failure simulation tool 120 temporarily stores the send pointers 102–107 and the receive pointers 82–87 from the linked lists 80, 81 into the original pointers list 126. The network failure simulation tool 120 then traverses the linked lists 80, 81 replacing the send pointers 102–107 with pointers to the substitute send packet handler 124, and the receive pointers 82–87 with pointers to the substitute receive packet handler 122 as shown in FIG. 4. As a result, calls from the send handler callers 110–112 in the protocol drivers 60–62 which are intended to pass packets to the send packet handlers 108–109 of the netcard drivers 58–59 for sending on the networks 52–53 are instead routed to the substitute send packet handler 124. Further, calls from the receive handler callers 114–115 which are intended to pass packets received from the networks 52–53 to the receive packet handlers 92–94 in the protocol drivers 60–62 are instead routed to the substitute receive packet handler 122.

The substitute receive packet handler 122 and the substitute send packet handler 124 in the illustrated embodiment are implemented as "stub" functions which accept the packets being sent or received through the network I/O architecture 50, but do nothing with the packets. The substitute send packet handler 122 and the substitute receive packet handler 124 simply return a status value to their respective send handler callers 110–112 and receive handler callers 114–115 that indicates successful sending or receiving of the packets. Accordingly, it appears to the protocol drivers 60–62 that the packets being sent were successfully passed to the lower netcard driver layer 57 and sent on the networks 52–53. Likewise, it appears to the netcard drivers 58–59 that the packets being received were successfully passed to the higher protocol layer 63 and received by the intended application 56, or the network server 66. The packets, however, are not passed on to the protocol or netcard layers 57, 63 by the substitute handlers 122, 124. The network failure simulation tool 120 therefore effectively intercepts the packets being sent or received on the network at the NDIS interface layer 70 with the substitute handlers 122, 124. In the illustrated embodiment, the substitute send and receive packet handlers 122, 124 have the form of the following stub functions (in C programming language syntax).

```
STATUS      substituteSendHandler ( . . . )
{           return SUCCESS;
}
STATUS      substituteReceiveHandler ( . . . )
{           return SUCCESS;
}
```

By intercepting packets at the NDIS layer, the network failure simulation tool 120 has a similar effect to that of manually disconnecting the network cable from the computer system 20. Other computers attempting to send packets to the computer system 20 will not receive a response, and the computer system 20 will not receive a response when trying to send packets to other computers.

In alternative embodiments of the invention, the substitute receive packet handler 122 and the substitute send packet handler 124 can be implemented as stub functions which return a status value other than one which is indicative of successful receiving or sending of a data packet. For example, the substitute handlers 122, 124 can be implemented so as to return a status value which indicates a "network media failure" or other some other status.

Further, instead of being implemented as a dummy handler or stub function which do nothing but return a status value, the substitute handlers 122, 124 can alternatively be implemented as functions which contain code for simulating network failure conditions where sending or receiving is not completely interrupted. For example, in some alternative embodiments, such intelligent substitute handlers could contain code to filter data packets being sent or received based on their content, such as a source or destination machine address in the packet. Depending on the data packet's content, the code in the intelligent substitute handler then determines whether the data packet is actually sent or received by transferring to the original handler, or interrupted from being sent or received (as with the dummy handler). As another example, an intelligent substitute handler in an alternative embodiment can contain code to intermittently return a status value indicating some kind of network failure condition, while otherwise returning a status value indicating successful sending or receiving.

The network failure simulation tool 120 also can resume normal network operation after a simulated network failure. To resume normal network operation, the network failure simulation tool 120 again traverses the linked lists 80, 81 of open blocks in the NDIS interface layer 70, replacing the pointers to the substitute send and receive handlers 122, 124 with the original send and receive handler pointers that have been stored in the original pointers list 126. As a result, the open blocks 72–77 of the linked lists 80, 81 again contain the send and receive pointers to the send pack handlers 108–109 and receive packet handlers 92–94 as shown in FIG. 3. Once restored, the protocol drivers 60–62 begin receiving packets from the networks 52-53 again, and packets that the protocol drivers 60–62 attempt to send are actually sent on the network. This effectively reconnects the computer system 20 to the networks 52–53.

The network failure simulation and resumption operations of the network failure simulation tool 120 are controlled in the illustrated embodiment by an automated software testing application 128 using a suspend network command 130 and a resume network command 131. In the illustrated embodiment, these commands 130–131 are implemented as I/O controls ("IOCTLS") in the Windows NT operating system. The suspend network command 130 causes the network failure simulation tool 120 to simulate a network failure as described above. The resume network command 130 causes the network failure simulation tool 120 to resume normal network operation as described above.

The suspend and resume network commands 130–131 in the illustrated embodiment take arguments with which the automated software testing application can specify selected of the protocol drivers 60–62 and netcard drivers 58–59 for disconnecting or connecting, respectively. For example, the automated software testing application can specify particular protocol drivers 60–62, particular netcard drivers 58–59, or particular combinations of protocol drivers and netcard drivers to disconnect or reconnect. In response, the network failure simulation tool 120 disconnects or reconnects only the selected driver or drivers 60–62, 58–59. This allows the automated software testing application 128 to control specifically which protocol and/or netcard is "actually" used on the network at a given time, and cause network connections to be made over netcard/network protocol combinations that would otherwise not be made under ordinary circumstances.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a computer system having an adapter for connecting to a network and a multiple layer network input/output system with a send handler and a receive handler for respectively sending and receiving data on the network, a computer implemented method for programmatically simulating a network failure under control of a testing program, the method comprising:

under testing program control, directly replacing a reference to the send handler with a reference to a substitute send handler to redirect from the send handler to the substitute send handler calls for sending data outwardly directed via the network, the substitute send handler returning a first status datum indicative of a condition of the network without relaying the outwardly directed data, whereby the send handler ceases processing the outwardly directed data; and under testing program control, directly replacing a reference to the receive handler with a reference to a substitute receive handler to redirect from the receive handler to the substitute receive handler calls for receiving data inwardly directed via the network, the substitute receive handler returning a first status datum indicative of a condition of the network without relaying the inwardly directed data, whereby the receive handler ceases processing the inwardly directed data.

2. A computer-readable medium having computer-executable instructions for performing the method recited in claim 1.

3. The method of claim 1 wherein the substitute send handler is a dead end handler returning a status datum indicative of successfully sending the data, without relaying the outwardly directed data and the substitute receive handler is a dead end handler returning a status datum indicative of successfully receiving the data, without relaying the inwardly directed data.

4. The method of claim 1 further comprising:
storing the reference to the send handler for later retrieval;
storing the reference to the receive handler for later retrieval;
under testing program control, directly replacing the reference to the substitute send handler with the stored reference to the send handler to restore direction of the calls for sending the outwardly directed data via the network to the send handler; and
under testing program control, directly replacing the reference to the substitute receive handler with the stored reference to the receive handler to restore direction of the calls for receiving the inwardly directed data via the network to the receive handler;
whereby the send handler resumes processing the outwardly directed data and the receive handler resumes processing the inwardly directed data.

5. A computer-readable medium having computer-executable instructions for performing the method recited in claim 4.

6. A network failure simulator for a computer system having network hardware for at least one network connection, a send handler for sending outwardly directed data from the computer to the network and a receive handler for receiving inwardly directed data from the network to the computer, the network failure simulator comprising:

a substitute send handler for intercepting data being sent on the at least one network connection, wherein the substitute send handler is operative to return a first status datum indicative of a condition of the network and to not send the outwardly directed data from the computer to the network;

a substitute receive handler for intercepting data being received on the at least one network connection, wherein the substitute send handler is operative to return a first status datum indicative of a condition of the network and to not receive inwardly directed data from the network to the computer; and a testing program operative to directly replace a reference to the send handler with a reference to the substitute send handler and to directly replace a reference to the receive handler with a reference to the substitute receive handler, whereby sending of the outwardly directed data by the send handler is prevented and receiving of the inwardly directed data by the receive handler is prevented.

7. The network failure simulator of claim 6 wherein the substitute send handler is a dead end handler returning a value indicative of having successfully sent an outwardly directed packet without relaying the outwardly directed packet to a next network layer and the receive handler is a dead end handler returning a value indicative of having successfully received an inwardly directed packet without relaying the inwardly directed packet to a next network layer.

8. The network failure simulator of claim 6 further comprising:
an original pointer store for storing references to replaced handlers, the original pointer store containing a reference to the send handler and a reference to the receive handler and operative to recall the references for directing calls for sending data back to the send handler and directing calls for receiving data back to the receive handler.

9. A computer implemented method for simulating a network failure to automate testing of a network application in a computer system having an adapter for connecting to a network and a multiple layer network input/output system with a send handler and a receive handler for respectively sending and receiving data on the network, the method comprising:

sending a suspend network command from an automated software testing application to a network failure simulation tool;

with the network failure simulation tool, in response to the suspend network command, redirecting calls for sending outwardly directed data via the network from the send handler to a substitute handler returning a status datum indicative of a condition of the network and not relaying the outwardly directed data onto the network; and with the network failure simulation tool, in response to the suspend network command, redirecting calls for receiving inwardly directed data via the network from the receive handler to a substitute handler returning a status datum indicative of a condition of the network and not relaying the inwardly directed data from the network, whereby the automated software testing application controls disconnecting the network from the computer system.

10. A computer-readable medium having computer-executable instructions for performing the method recited in claim 9.

11. The method of claim 9 further comprising:
sending a resume network command from the automated software testing application to the network failure simulation tool;
with the network failure simulation tool, in response to the resume network command, restoring direction of the calls for sending outwardly directed data via the network to the send handler; and with the network failure simulation tool, in response to the resume network command, restoring direction of the calls for receiving inwardly directed data via the network to the receive handler, whereby the automated software testing application controls reconnecting the network to the computer system.

12. The method of claim 9 wherein the substitute handlers are dead end handlers.

13. In a computer system having an adapter for connecting to a network and a multiple layer network input/output system with a send handler residing in a network layer and a receive handler residing in a network layer for respectively sending and receiving packets on the network, a method for simulating a network failure, the method comprising the steps of:

redirecting calls for sending outwardly directed packets via the network from the send handler to a first substitute handler operative to return a first status datum indicative of a condition of the network and to not relay the outwardly directed packets to a lower layer; and redirecting calls for receiving inwardly directed packets via the network from the receive handler to a second substitute handler operative to return a second status datum indicative of a condition of the network and to not relay the inwardly directed packets to a higher layer, whereby calls for sending and receiving packets are blocked from executing the send and receive handlers and network access by the computer system is suspended.

14. A computer-readable medium having computer-executable instructions for performing the method recited in claim 13.

15. The method of claim 13 further comprising the steps of:

restoring direction of the calls for sending data via the network to the send handler; and restoring direction of the calls for receiving data via the network to the receive handler, whereby calls for sending and receiving data via the network cease being redirected to the substitute handlers and network access by the computer system is resumed.

* * * * *

UNITED STATES PATENT AND TRADEMARK OFFICE
CERTIFICATE OF CORRECTION

PATENT NO.   : 5,862,362
DATED        : January 19, 1999
INVENTOR(S)  : Somasegar et al.

It is certified that error appears in the above-identified patent and that said Letters Patent is hereby corrected as shown below:

<u>Column 7,</u>
Line 48, "or other some other" should be -- or some other --.

Signed and Sealed this

Twenty-eighth Day of May, 2002

Attest:

JAMES E. ROGAN
*Director of the United States Patent and Trademark Office*

*Attesting Officer*